July 8, 1947.    M. D. CAFFIN    2,423,551
SCREW MACHINE COLLET STOP
Filed May 28, 1945
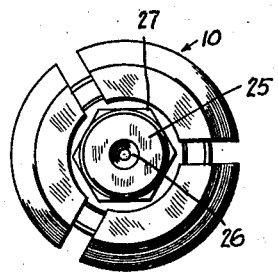
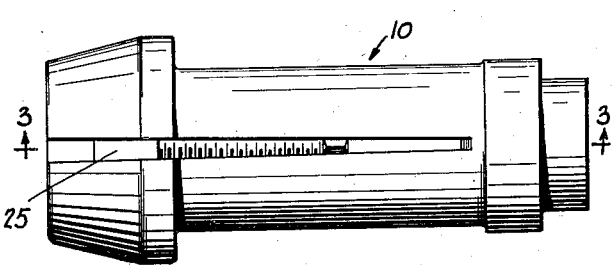
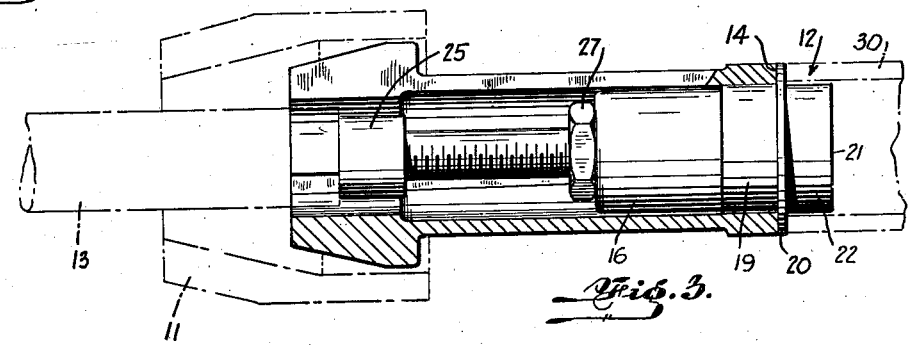
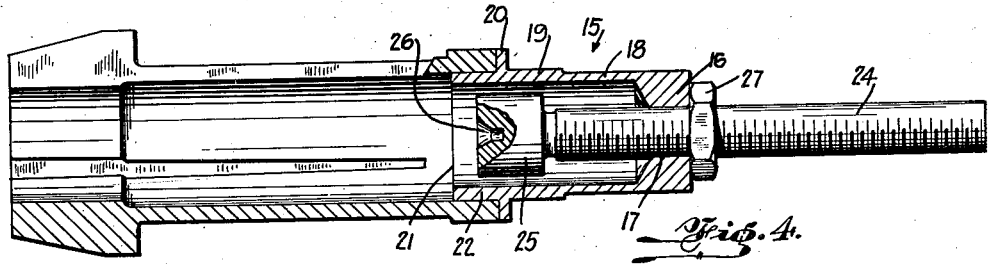
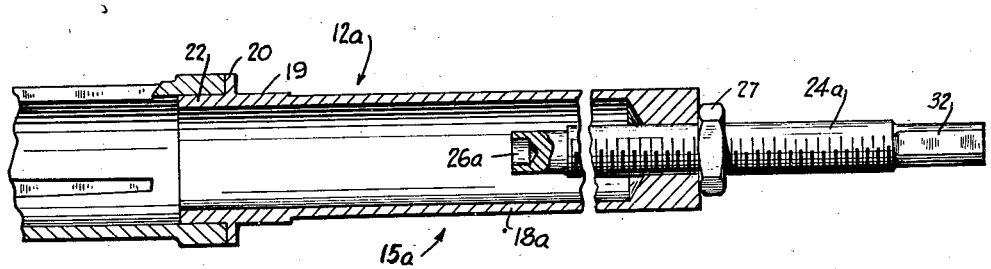
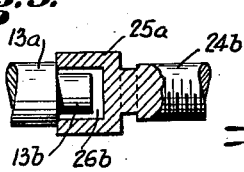
INVENTOR.
MILTON D. CAFFIN.
BY
ATTORNEY.

Patented July 8, 1947

2,423,551

UNITED STATES PATENT OFFICE 2,423,551

SCREW MACHINE COLLET STOP

Milton D. Caffin, New York, N. Y.

Application May 28, 1945, Serial No. 596,317

4 Claims. (Cl. 279—46)

This invention relates to collet stops for spindle lathes and particularly for non-automatic screw machines. Where screw machines are used for producing a number of similar pieces of work, it has been customary to make a stop member for insertion in the collet chuck of the machine, so that repeat work pieces may be inserted in the collet to the identical extent. A separate and specific stop had to be made to fit each need and these stops are usually stored for future use. Obviously in a short time, a considerable number of such stops will have been made, used and stored. Considerable labor and material are thus required to produce special stops for each job. It is, therefore, an object of the present invention to provide an adjustable stop for use with screw machine collet chucks, adaptable for use on many and varied jobs.

A further object of this invention is to provide a collet stop of the character described, having a large range of adjustment, and which may be mounted on the collet in either of two positions to give a greater range of adjustment.

Yet another object of this invention is to provide a collet stop of the character described, comprising a tubular member formed with an end wall having an axial screw-threaded opening to receive an adjustable screw-threaded stop, said tubular member being formed with an annular shoulder or flange spaced from the open end of the tube and likewise spaced from said end wall, either end of said tubular member being insertable into the collet, and said flange being adapted to contact one end of the collet so that one end of the tube is within the collet and the other end of said tube projects into the plunger.

Yet another object of this invention is to provide a strong and durable collet stop of the character described, which shall be relatively inexpensive to manufacture, easy to assemble and adjust, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention:

Fig. 1 is a side elevational view of a collet provided with a collet stop embodying the invention.

Fig. 2 is a front end view of the collet and collet stop.

Fig. 3 is a cross-sectional view taken on line 3—3 of Fig. 1.

Fig. 4 is a view similar to Fig. 3 but showing the collet stop mounted on the collet in a reversed position.

Fig. 5 is a view similar to Fig. 4 but illustrating a modified construction.

Fig. 6 is a fragmentary view partly in section, illustrating a modification.

Referring now in detail to the drawing, 10 designates a collet projecting into a spindle nose hood 11 of a lathe. In accordance with the present invention, there is provided an improved collet stop 12, serving as a stop for a work piece 13 to be gripped by the collet. The collet 10 is of usual construction having a rear end edge 14. The collet stop 12 comprises a tubular member 15 formed with a thickened end wall 16 at one end. The end wall 16 is formed with an axial screw-threaded opening 17. Extending from the end wall 16 is a cylindrical wall 18 and extending from wall 18 is a thickened cylindrical wall 19 having an external diameter to provide for a sliding fit within the rear end of the collet. At one end of wall 19 is an outwardly extending annular flange or shoulder 20. Flange 20 is spaced from the open end 21 of tube 15 and also spaced from the end wall 16. The tube is formed with a cylindrical wall 22 between flange 20 and end edge 21. The outer diameter of wall 22 is the same as the outer diameter of wall 19. The length of wall 22 is substantially the same as the length of wall 19. It will be noted that wall 18 is of uniform diameter and of smaller diameter than walls 19 and 22.

Adjustably positioned within the screw-threaded opening 17 is a stop screw 24. At one end of screw 24 is an enlarged head 25 which may be formed with a center hole 26. The work piece 13 contacts the head 25. Threaded on screw 24 is a lock nut 27 which may be tightened against the end wall 16. The screw 24 may be adjusted by loosening the nut 27 and turning the screw to desired position. Then the nut 27 is tightened against the end wall.

It will be noted that tube 16 may be mounted on the collet in either the position shown in Fig. 3 or the position shown in Fig. 4. In Fig. 3 the tube 15 is inserted into the collet with the end wall 16 at the front end so that the wall 19 engages within the collet. The shoulder or flange 20 contacts the rear end 14 of the collet, and the plunger 30 contacts an opposite side of the flange to force the collet into the nose hood 11 to close the collet jaws onto the work 13. In such position, the screw 24 will have a certain range of adjustment limited by contact of the head 25 with the nut 27. If longer work pieces are to be cut, the tube 15 is mounted on the collet in the position shown in Fig. 4. The screw 24 may also be reversed on the tube 15, so that the head 25 can be drawn back within the tube 15, if necessary. The collet stop thus has a large range of adjustment.

Should it be necessary to cut still longer work pieces the collet stop 12a shown in Fig. 5 and embodying the invention and illustrating a modified construction may be substituted for the collet stop 12. The collet stop 12a comprises a tube 15a similar to tube 15 except that it is provided with a wall 18a corresponding to wall 18 but much longer. Adjustably received within the end wall of tube 15a is a screw 24a formed at one end with a center hole 26a, its other end being provided with a polygonal portion for facilitating the application of a wrench should it be necessary or desirable to do so.

If it be necessary to perform very precise work, it will be understood, after stop is inserted in the collet, it may be faced off on the end. In Fig. 6 there is shown a further modification in which the head 25a may be recessed as at 26b to receive shouldered work pieces 13a and allow the shoulder to abut against the faced annular rim of the stop.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, what I claim as new and desire to secure by Letters Patent is:

1. A collet stop comprising a tubular member having an end wall formed with an axial screw-threaded opening, said tubular member being formed with an annular shoulder spaced from the open end of the tubular member, said shoulder being spaced from said end wall, a screw screwed within said screw-threaded opening, said screw being formed with a head at one end provided with a center hole, and a nut screwed on said screw and contacting said end wall, the outer surfaces of the tubular member at opposite sides of the shoulder being of substantially equal diameter to permit insertion of the tubular member into the rear end of the collet with either end of said tubular member projecting into said collet, the diameter of the tubular member at the end thereof adjacent the end wall being less than the diameter of said tubular member adjacent said shoulder.

2. A collet stop comprising a tubular member open at one end and having at its other end a wall formed with an axial screw-threaded opening, said tubular member being formed with an annular outwardly extending flange adjacent its open end, and a screw adjustably engaged in said screw-threaded opening, the outer diameter of said tubular member on opposite sides of said flange being uniform and of a size to nicely fit the internal diameter of the rear end of a conventional collet.

3. A collet stop comprising a tubular member open at one end and having at its other end a wall formed with an axial screw-threaded opening, said tubular member being formed with an annular outwardly extending flange, and a screw adjustably positioned in said screw-threaded opening, the outside diameter of said tubular member on opposite sides of said flange, being uniform and of a size to slidingly fit the internal diameter of the rear and of a conventional collet, and being positionable on said collet selectively with either end of said tubular member facing the front end of the collet, said flange being spaced from, but relatively close to the open end of the tubular member and also spaced from said end wall, the space between the flange and the end wall being considerably greater than the space between the flange and said open end whereby when the tubular member is positioned with its open end facing the front of said collet, the forward end of said screw may be positioned a substantial distance rearward of the rear end of said collet.

4. A collet stop comprising a tubular member open at one end and having at its other end a wall formed with an axial screw-threaded opening, said tubular member being formed with an external annular flange spaced from, but near to the open end of the tubular member, said flange being spaced from said end wall, the space between the flange and the end wall exceeding considerably the space between the flange and said open end, a screw screwed within said screw-threaded opening, said screw being formed with a head at one end provided with a center hole, and a nut on said screw and contacting said end wall, the outer diameter of the tubular member at opposite sides of the flange being substantially equal and substantially the same as the inner diameter of the rear end of the collet to permit insertion of the tubular member into said end of the collet with either end of said tubular member facing the front end of said collet.

MILTON D. CAFFIN.

REFERENCES CITED

The following references are of record in the file of this patent:

UNITED STATES PATENTS

| Number | Name | Date |
|---|---|---|
| 513,931 | Hutchinson | Jan. 30, 1894 |

OTHER REFERENCES

Article from American Mach., Dec. 8, 1921, page 935, (copy of which is in Division 52).